United States Patent
Pantich

[19]
[11] Patent Number: 5,942,121
[45] Date of Patent: Aug. 24, 1999

[54] METHOD AND APPARATUS FOR FILTERING, DEGASSING, DEHYDRATING AND REMOVING PRODUCTS OF AGEING IN PETROLEUM OILS

[75] Inventor: Vladimir Pantich, Belgrad, Yugoslavia

[73] Assignee: Mikhailo Pantich, Moscow, Russian Federation

[21] Appl. No.: 08/776,649

[22] PCT Filed: May 30, 1996

[86] PCT No.: PCT/RU96/00142

§ 371 Date: Feb. 7, 1997

§ 102(e) Date: Feb. 7, 1997

[87] PCT Pub. No.: WO96/40841

PCT Pub. Date: Dec. 19, 1996

[30] Foreign Application Priority Data

Jun. 7, 1995 [YU] Yugoslavia .................................. 384/95

[51] Int. Cl.[6] ........................... B01D 15/00; C10G 25/05; C10M 175/02
[52] U.S. Cl. ........................... 210/664; 210/90; 210/266; 210/269; 210/283; 210/689; 208/182; 208/307
[58] Field of Search ........................... 200/664, 667, 200/669, 670, 671, 689, 266, 269, 274, 283, 285, 286, 86, 90; 208/178, 179, 181, 182, 185–188, 299, 301–303, 305–307

[56] References Cited

U.S. PATENT DOCUMENTS

| | | | |
|---|---|---|---|
| 3,620,969 | 11/1971 | Turnock et al. | 208/307 |
| 4,179,019 | 12/1979 | Danziger | 208/182 |
| 4,498,992 | 2/1985 | Garrett | 210/604 |
| 4,502,948 | 3/1985 | Tabler | 208/181 |
| 4,551,234 | 11/1985 | Hettinger, Jr. | 208/179 |
| 4,609,458 | 9/1986 | Okamura et al. | 210/85 |
| 4,726,818 | 2/1988 | Yeung et al. | 210/689 |
| 5,112,479 | 5/1992 | Srimongkolkul | 210/266 |
| 5,122,276 | 6/1992 | Loikits | 210/689 |
| 5,167,804 | 12/1992 | Tiggelbek | 210/266 |
| 5,466,364 | 11/1995 | Kaul et al. | 208/307 |
| 5,574,214 | 11/1996 | Balton et al. | 210/689 |

FOREIGN PATENT DOCUMENTS

| | | |
|---|---|---|
| 415287 | 6/1994 | U.S.S.R. . |
| 26 744 | 12/1967 | Yugoslavia . |
| 29 045 | 6/1970 | Yugoslavia . |

Primary Examiner—Thomas G. Wyse
Attorney, Agent, or Firm—Pennie & Edmonds LLP

[57] ABSTRACT

The invention relates to separating different substances, more concretely, to a method and apparatus for filters, degassing, dehydrating and removing products of ageing in insulating and other petroleum oils. The technical result is that the aforesaid phases of processing oil or a mixture of oils are ensured with high efficiency for a single passage through an active component, and also the possibility of regenerating the adsorbents being used is ensured during the process of operation of the equipment, with simultaneous simplification of the construction and reduction of size and of power consumption. The apparatus 1 for filtering, degassing, dehydrating and removing products of ageing comprises at least one tank 2, in which are disposed cylindrical partitions 3, 4 filled with an adsorbent 5 and secured in the tank 2 by means of fixing elements 6. Partitions 3, 4 form channels for the passage of oil being processed. The tank 2 has an inlet opening 7 and an outlet opening 8, with mechanical filters 9, 10 mounted in the openings. An electric drive 12, connected to a delivery pump 13, is mounted on a base 11 of the apparatus 1. Equipment 14 for protecting and starting the electric drive 12 is also arranged on the base 11. Circulation pipe-lines 15 interconnect separate parts of the apparatus 1, and also connect separate apparatuses 1 in the composition of installations for processing oils to each other and to a user's tanks with the oil being processed.

16 Claims, 4 Drawing Sheets

METHOD AND APPARATUS FOR FILTERING, DEGASSING, DEHYDRATING AND REMOVING PRODUCTS OF AGEING IN PETROLEUM OILS

FIELD OF THE INVENTION

The invention relates to separating different substances associated with the processing of hydrocarbon oils, and more concretely, to a method and apparatus for filtering, degassing, dehydrating and removing products of ageing in insulating and other petroleum oils.

BACKGROUND ART

It is known that the content of only an insignificant amount of moisture, gases and products of ageing, which are produced both during use and in the process of storage, is permissible in insulating and other petroleum mixtures when they are used. This relates both to new oils ready for use and to mixed oils, and also to oils used in high-voltage apparatuses such as power and measuring transformers, high-voltage switches, etc. An increase in the content of the aforesaid substances above the permissible values more often than not is a consequence of unsuitable conditions for storage and use. And in insulating oil in high voltage apparatuses, furthermore, this is a consequence of ageing of oil-paper insulation, wherein this process accelerates in time. The process of ageing is that under the effect of heated conductors, and also in the presence of ferromagnetic transformer steel, the polymerized molecules of cellulose insulation decompose and oxidize the oil molecules. The products of ageing pass from the paper insulation into the oil and as catalysts provide for a high level of oxidation until acids appear. Wherein the degraded oil acts on the cellulose of the insulation and accelerates the process of ageing. Simultaneously, the presence of moisture in insulating oils substantially reduces their dielectric constant, which is the most important characteristic of the oils used in high-voltage apparatuses.

Apparatuses with filters and vacuum chambers for degassing and dehydrating oil are known in engineering practice. Centrifugal equipment with chambers for degassing and dehydrating is also known.

A drawback of the aforesaid known apparatuses with filters and vacuum chambers is that when gases and dissolved water are extracted in a high vacuum from the oil, easily evaporating fractions of petroleum are also removed, which impairs the quality of the processed oil. Furthermore, the complexity of the equipment and of the process of its operation should also be listed as drawbacks.

The relative complexity of the equipment and significantly higher consumption of adsorbents, especially during the processing of highly degraded oils of old transformers, should be indicated as drawbacks of centrifugal equipment with chambers for degassing and dehydrating with adsorbents. A separate problem here is how to get rid of contaminated adsorbents after their use, since they are refuse with carcinogenic properties.

A method of filtering mineral oils and an apparatus for carrying out the method are known and disclosed in Yugoslavian patent No. 26744. Filtering and dehydrating an oil mixture in that known apparatus are carried out using filters comprising a layer of sodium chloride having a thickness of about 100 mm. Wherein the emulsion being processed passes through an N 3 sieve at a positive pressure of about 29.4 kPa and linear flow rate of $5\times10^{-2}$ m/s. The emulsion passing through the capillary barriers contacts with the filtering layer. As a consequence thereof the dispersed phase loses kinetic energy, and its concentration in a certain cross section of the filtering layer rises. Since therewith dehydration of the dispersed particles also takes place, they can be removed due to precipitation into a residue.

Among the drawbacks of this known solution is the low efficiency of purification of the oils being processed. It does not ensure the required degree of filtration, degassing, dehydration and removal of products of ageing in insulation oils during one cycle of running the oil through the filterng component.

A method of filtering and a filter with an ion-exchanger for carrying out the method are also known and disclosed in Yugoslavian patent No. 29045. In this patent provision is made for the possibility of regenerating the filter without moving and removing the active component. For this an elastic bag of the blacksmith bellows type, which swells during regeneration of the filter and presses against the surface of the active component when liquid is passed through the filter for regeneration, is positioned above a layer of active filtering material disposed on top of a corresponding sieve. This liquid flows in the opposite direction, without bringing about a change in the structure of the active component which is freed from the particles restrained during filtering.

The aforesaid drawbacks, which on the whole can be characterized as insufficient efficiency of purification of the oils being processed and of regeneration of the active component when it is saturated, are also characteristic for that known solution.

DISCLOSURE OF THE INVENTION

In accordance with the foregoing, the object of the invention is to overcome the drawbacks of the technical solutions known from prior art and to create a method and an apparatus for realization thereof which would ensure filtering, degassing, dehydrating and removing products of ageing in insulating and other petroleum oils, for one cycle of processing, i.e. for a single passage of an oil mixture through an active component, and also ensure the possibility of regenerating adsorbents during the process of operation of the equipment, with simultaneous simplification of the construction and reduction of size and of power consumption.

This technical result is achieved in that in a method for filtering, degassing, dehydrating and removing products of ageing in insulating and other petroleum oils, which is based on passing the oil or mixture of oils to be processed through an active component, in accordance with the invention, the oil is passed through at least one mechanical filter for restraining particles of sizes exceeding predetermined sizes, the oil or mixture of oils filtered by the mechanical filter is passed through the active component, at least one adsorbent being used as the active component, the oil is directed through channels formed in a tank with the adsorbent, the tank having longitudinal and transverse partitions, wherein separate phases of processing, including degassing, dehydrating, removing products of ageing, are carried out due to filling separate parts of the cavity of the tank with adsorbents having different characteristics.

It is preferable that particles of a size greater than $4\times10^{-3}$ mm be restrained during mechanical filtration.

It is also preferable that aluminosilicates of a crystalline structure with polar molecules of Na or Ca and Si in the crystalline lattice points be used as the adsorbent when the phases of degassing and dehydrating are carried out, and that aluminum trioxide of the gamma-type with a surface charge of the molecules be used when the phase of removing the products of ageing is carried out.

Furthermore, it is preferable that regeneration of the saturated adsorbent be carried out after saturation of the adsorbents, wherewith regeneration of the saturated adsorbents used for degassing and dehydrating is carried out by heating them to a temperature of about 573 K or by acting on them with a high air pressure which is sharply increased by means of a compressor with dry air to a value of about 300 kPa, with the separated gases being subsequently drawn out. Regeneration of the saturated adsorbents used to remove the products of ageing is carried out by heating in the presence of air to a temperature of about 873 K, ensuring oxidation of the bonded polar molecules of products of ageing to water molecules and carbon dioxide.

This result is also achieved in an apparatus for filtering, degassing dehydrating and removing products of ageing in insulating and other petroleum oils, comprising a vessel with an active component, in that in accordance with the invention, the device comprises at least one tank having at least one aperture for filling with an active component and inlet and outlet openings for feeding and discharging the oil or mixture of oils to be processed, input and output mechanical filters disposed in the aforesaid inlet and outlet openings of the tank, circulation pipes connected with the aforesaid inlet and outlet openings, at least two longitudinal partitions mounted inside the tank with the active component and forming channels for the passage of oil or mixture of oils being processed, wherein an adsorbent is used as the active component.

It is advisable that a transverse permeable partition be introduced to separate the inner cavity of the tank with the active component into separate sections to be filled with a corresponding active component, wherein the upper part of the tank, above the transverse partition, can be filled with an adsorbent for carrying out the dehydration phase, while the lower part thereof below the transverse partition—with an adsorbent for carrying out the degassing phase, wherein apertures can be made in the transverse partition along its periphery.

It is preferable that the input and output mechanical filters be made of baked bronze ensuring the restraining of particles having a size greater than $4\times10^{-3}$ mm.

It is advisable that use be made of a measurer of the adsorbent saturation and a manometer, which are mounted in the apertures for filling the tank with the adsorbent.

It is also preferable that the tanks filled with at least one absorbent for carrying out the separate phases of processing oil or a mixture of oils be successively connected by pipe-lines so that the inlet opening of the first tank is connected to a delivery pump, while the outlet opening of the last tank is connected to a user's tank with the oil or mixture of oils being processed.

Furthermore, it is preferable that the tanks filled with at least one absorbent for carrying out the separate phases of processing oil or a mixture of oils be connected in parallel by pipe-lines so that the inlet openings of the tanks are connected through a first collector to a delivery pump, while their outlet openings are connected through a second collector to the user's tank with the oil or mixture of oils being processed.

It is also preferable that the adsorbent be made in the form of granules having a diameter of from 0.5 to 2.0 mm. Wherein, it is preferable that aluminosilicates having a crystalline structure with molecules of Na or Ca and Si in the crystalline lattice points be selected as the material of the adsorbent for carrying out the degassing and dehydrating phases, while aluminum oxides, preferably gamma-type aluminum trioxide, having an average pore diameter greater than $9\times10^{-6}$ mm and an effective surface not less than 150 $m^2/cm^3$, be selected as the material of the adsorbent for bonding the products of ageing or polar molecules.

BRIEF DESCRIPTION OF THE DRAWINGS

The invention is explained below by examples of its embodiment, illustrated by the drawings which show the following.

DETAILED DESCRIPTION OF EMBODIMENTS

Figure 1:
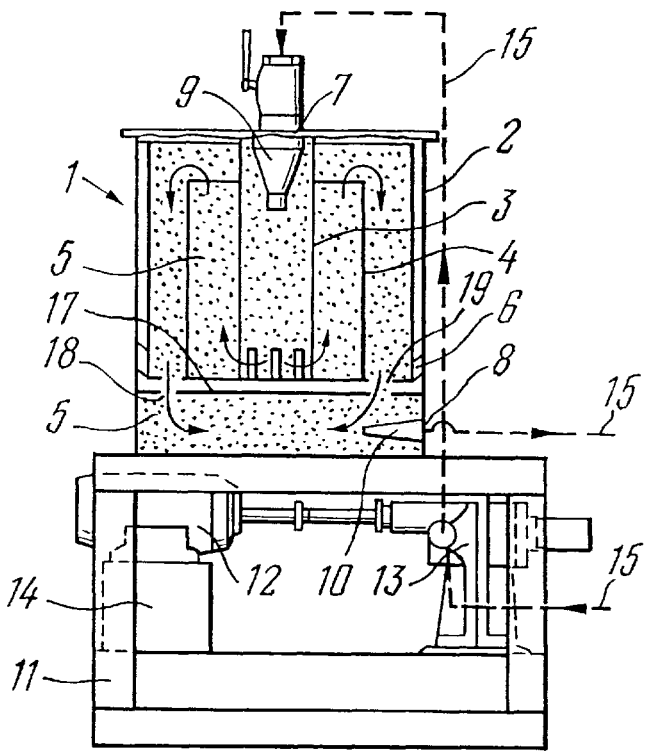
FIG. 1 is a schematic view of the apparatus, according to the invention.
Figure 2:
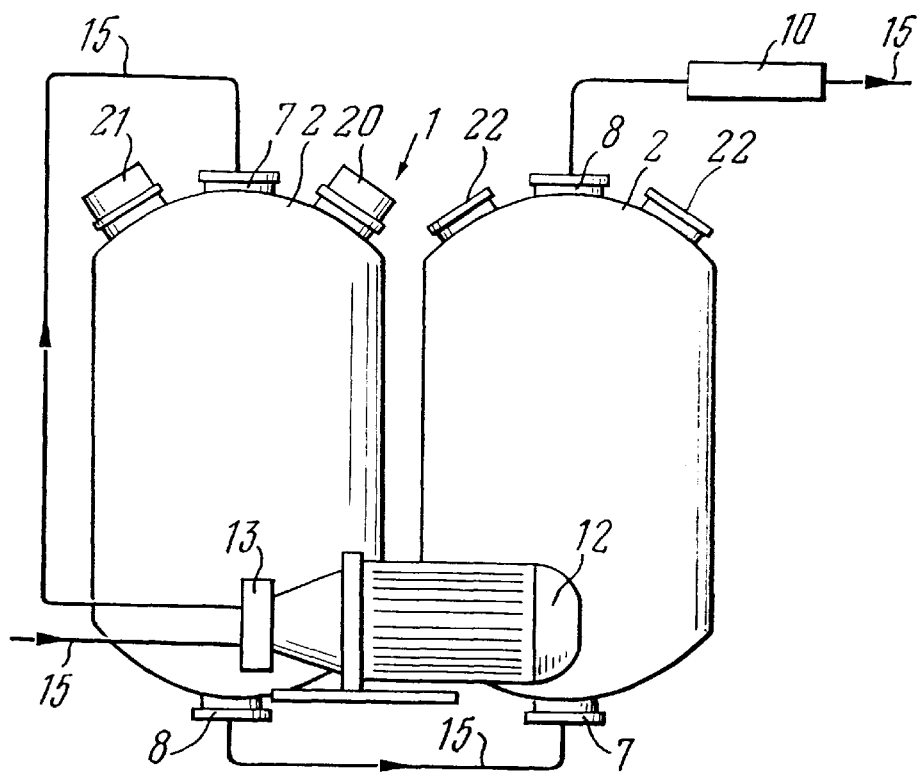
FIG. 2 is a schematic view of an installation for processing oils in accordance with the invention and using the apparatus according to FIG. 1.
Figure 3:
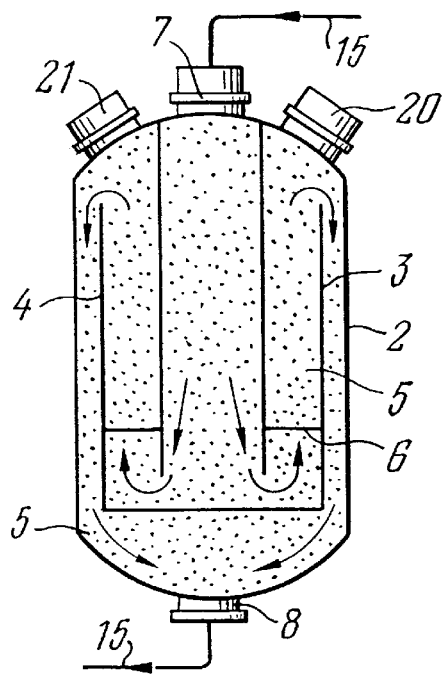
FIG. 3 is a schematic view of a fragment of the construction of the apparatus according to FIG. 1.

As shown in FIGS. 1, 2 and 3, an apparatus 1 for filtering, degassing, dehydrating and removing products of ageing in insulating and other petroleum oils, comprises at least one tank 2, e.g. of cylindrical shape, in which at least two cylindrical partitions 3, 4 are disposed, filled with an adsorbent 5 and secured in the tank 2 by means of fixing elements 6. Partitions 3, 4 form channels for the passage of oil or mixture of oils being processed in the direction of the arrows shown in FIG. 1 and FIG. 3. The tank 2 has inlet and outlet openings 7, 8, respectively, in which mechanical filters 9 and 10 of a metal alloy, e.g. of baked bronze characterized by a certain porosity, are installed. An electric drive 12, connected to a delivery pump 13, is mounted on a base 11 of the apparatus 1. Electrical equipment 14 for protecting and starting the electric drive 12 is also arranged on the base 11.

Figure 4:
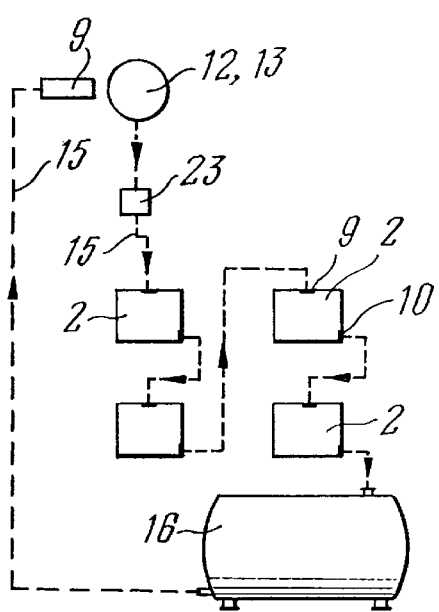
FIG. 4 is a schematic view of successively connected apparatuses according to FIG. 1 in an installation for processing oils in accordance with the invention.
Figure 5:
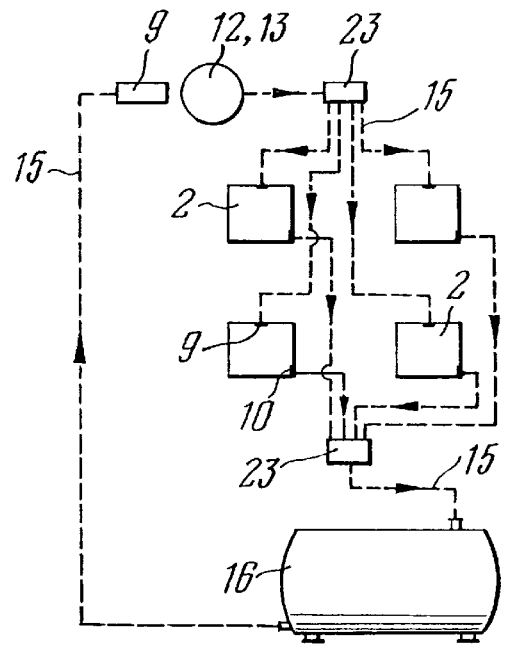
FIG. 5 is a schematic view of a parallel connection of apparatuses according to FIG. 1 in an installation for processing oils in accordance with the invention.

Circulation pipe-lines, conditionally shown by lines 15 with the directions of movement of oil indicated by the arrows, interconnect separate parts of the apparatus 1 and also connect separate apparatuses 1 in the composition of installations for processing oils to each other and to a user's tank 16 filled with oil being processed (see FIGS. 4, 5).

As shown in FIG. 2, the apparatus 1 may comprise two tanks 2, interconnected by circulation pipelines 15, and also connected to a pump 13 mounted in a pipe-line 15 connected to the inlet opening 7 of one of the tanks 2, the outlet opening 8 of which is connected to the inlet opening 7 of the other tank 2. The outlet opening 8 of the latter may be connected by means of a pipe-line 15 through a corresponding mechanical filter 10 to, for example, a corresponding tank with user's oil.

As shown in FIG. 3, the cylindrical partitions 3, 4 form relatively narrow channels inside the tank 2 for the passage of oil which is subjected to adsorption upon passage through the adsorbent 5. A horizontal partition 17, permeable for oil, may be mounted between the upper part of the tank with cylindrical partitions 3, 4 and the lower part. Apertures 18 for the passage of oil (see FIG. 1) are made along the periphery of the horizontal partition 17 and positioned opposite apertures 19 in the base of the cylindrical partition 4.

When the horizontal partition 17 is arranged in the tank 2, the separate parts of the tank formed thereby may be filled with an according adsorbent 5 for carrying out separate phases of processing the oil. For example, the upper part of the tank 2 may be filled with an adsorbent serving to remove moisture from the oil, while the lower part—with an adsorbent ensuring removal of gases from that same liquid being processed. Thus, different adsorbents 5 can be disposed in the tank 2 of the apparatus 1, which for a single passage of the oil ensure the carrying out of different phases of the process of dehydrating, degassing and separating polar molecules as products of oxidation or ageing with simultaneous filtration in mechanical filters 9, 10.

A measurer 20 of the saturation of the adsorbents and a manometer 21 for monitoring the pressure are used to monitor the process of filtering, degassing, dehydrating and removing the products of ageing. These instruments are mounted in apertures 22 for filling the tank 2 with the adsorbent 5.

An installation with several tanks 2, which can be interconnected by pipe-lines 16 either successively (FIG. 4) or in parallel (FIG. 5), may be created to carry out the complete process of filtering, degassing, dehydrating and removing products of ageing in insulating and other petroleum oils or mixtures of oils for one cycle of processing the oil. Wherein the connection of the aforesaid tanks 2 to the pump 13 and to the user's tank 16 is carried out through corresponding collectors 23.

Wherein separate tanks 2 can be filed with different adsorbents 5 for carrying out separate phases of processing the oil. The aforesaid successive or parallel connection of the tanks 2 makes it possible to carry out replacement of individual tanks, in which the adsorbents have reached the state of saturation, by removing and then connecting again flexible pipe-lines 15 without air penetrating into the adsorption system.

The process of filtering, degassing, dehydrating and removing products of ageing in insulating and other petroleum oils in the claimed apparatus in accordance with the invention is carried out in the following manner. By means of the pump 13, actuated by the electric drive 12, the oil or oil mixture is driven along the pipe-lines 15 and enters the tank 2 through corresponding mechanical filter 9 restraining particles having a size greater than a predetermined size, e.g. $4 \times 10^{-3}$ mm, and then pass along channels formed in the cavity of the tank 2 by longitudinal partitions 3, 4 and, if necessary, by the horizontal partition 17 with apertures 18. Wherein, depending on the specific features of the adsorbent 5 being used, degassing, dehydrating and removing the products of ageing is carried out as described below.

When the phase of degassing and dehydrating is being carried out, aluminosilicates of crystalline structure with molecules of Na or Ca and Si in the crystalline lattice points are used as the adsorbent 5 filling the parts of the tank 2 formed by partitions 3 and 4 or filling the whole of the tank 2. These molecules produce a strong electric field, as a result of which molecules of by-products, which have a size substantially less than the size of molecules of petroleum products remaining in a free state in the composition of the oil, are drawn into the crystalline lattice of the aluminosilicate.

When the phase of removing the products of ageing or decomposition is carried out, aluminum oxides are used as the adsorbent 5, in particular, aluminum trioxide of the gamma-type, the average pore size of which is about $9 \times 10^{-6}$ mm, while the active surface is not less than 150 $m^2/cm^3$. The action of this adsorbent is based on the fact that the surface of its pores has a surface charge, due to which bonding of the products of decomposition of oil or polar molecules takes place. All the used adsorbents 5 have the shape of granules with a diameter within the range of from 0.5 to 2.0 mm.

In the installations schematically shown in FIGS. 4 and 5, separate phases of the described method for processing oil or a mixture of oils can take place in separate tanks 2 connected successively or in parallel by pipe-lines 15. Wherein separate parts of the tank 2, separated by partitions 3, 4, can be filled with corresponding identical or different adsorbents 5.

Figure 6:
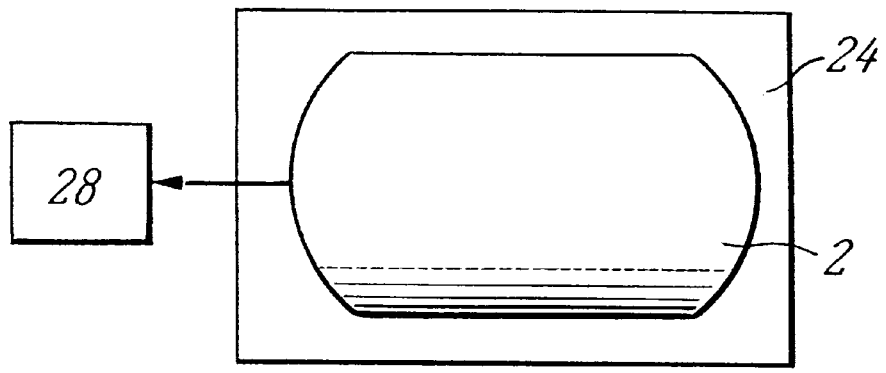
FIG. 6 is an illusion of the procedure for regeneration of the adsorbent for degassing.

After the adsorbents have become saturated, which is checked in the process of processing oil by means of the measurer 20 of the saturation of the adsorbents, regeneration of the adsorbents is carried out. The procedure of regeneration of the adsorbents used for degassing is illustrated in FIG. 6. Wherein the tank 2 with the adsorbent 5, from which the balance of the oil has been poured out, is placed in chamber 24 and heating to a temperature of about 573 K is carried out. This heating creates conditions for releasing molecules captured in the electric field of the crystalline structure of the adsorbent.

Figure 7:
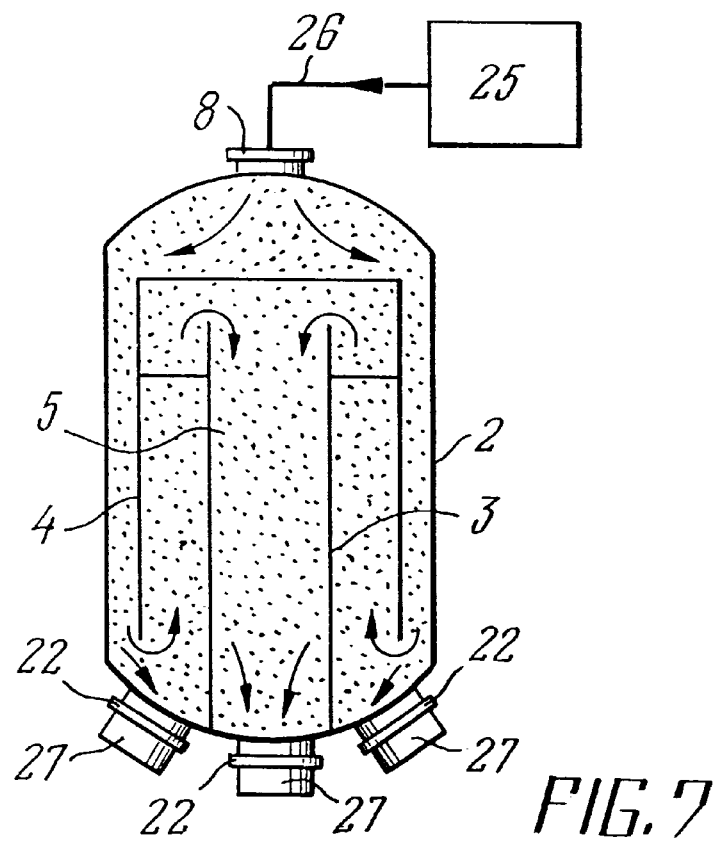
FIG. 7 is an illustration of the procedure for regeneration of the adsorbent for dehydrating.

During the process of regenerating the adsorbent 5 used in the dehydrating phase, as shown in FIG. 7, the tank 2 with the adsorbent 5 is blown through by means of the compressor 25 connected by pipe-line 26. Wherein valves 27 with screen filters are set in the apertures 22 of the tank 2, by means of which a sharp change of the air pressure occurs, due to the effect of which the molecules of water or air absorbed by the adsorbent leave the field of the crystalline structure of the adsorbent.

Regeneration of the adsorbents used in the phase of separating the products of ageing, as was indicated above, is carried out by heating them in tank 2 in the presence of air to a temperature of about 873 K, which results in oxidation of the bonded polar molecules to molecules of water and carbon dioxide gas.

Monitoring the pressure of the oil or oil mixture in tank 2 is also carried out in the process of operation of the apparatus 1 by means of the manometer 21. When the measured pressure rises to a value of about 100 kPa, cleansing of the mechanical filters 9, 10 of baked bronze is carried out by rinsing them in solvents and blowing with air under pressure. When the adsorbent 5 is saturated with water, the described process of regeneration according to FIG. 7 is carried out by increasing the pressure in tank 2 to about 300 kpa by means of the compressor 25, using preliminary purified air. The process is repeated until the adsorbent 5 acquires the required humidity. When the adsorbent is saturated with gases, the process of regenerating in accordance with FIG. 6 is carried out with the tank 2 connected at the final step to a vacuum pump 28 until the required degassed level is reached.

Figure 8:
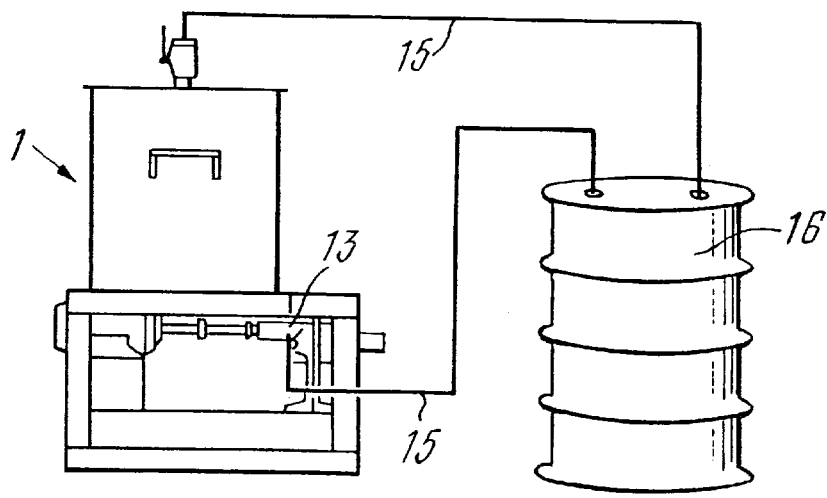
FIGS. 8, 9 and 10 are schematic views of different cases of use of the apparatus according to the invention.
Figure 9:
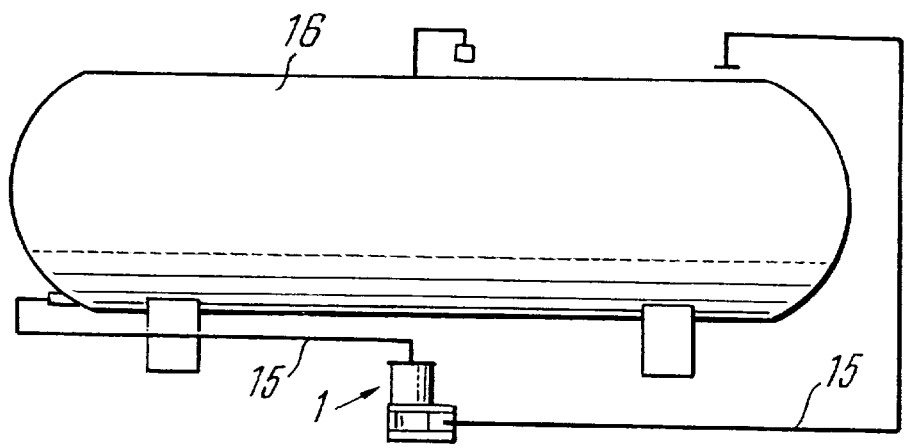
Figure 10:
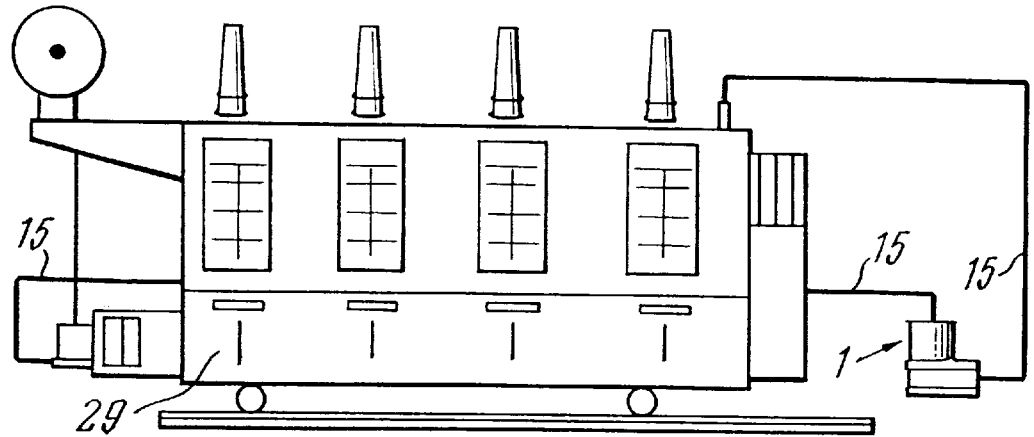

The possibility of using the method and apparatus according to the invention for filtering, degassing, dehydrating and removing products of ageing in insulating and other petroleum oils is illustrated by examples of purification of new and mixed oils (FIGS. 8 and 9) and for high voltage apparatuses (FIG. 10). As shown in FIGS. 8, 9, 10, the apparatus 1 is linked by flexible pipe-lines 15 to the user's tank 16 in the form of a barrel, vessel, transformer etc., from which the pump 13 sucks out unpurified oil which after passing through the apparatus 1 is returned in the form of purified oil, dehydrated and freed from gases.

In the case where the apparatus 1 is used in transformers 29 (FIG. 10), several tanks 2 with an adsorbent, which are linked to the transformer 29 in accordance with FIG. 4 or FIG. 5, can be used when it necessary to carry out the removal of products of ageing from the oil mixture in addition to filtering, degassing and dehydrating. Such a configuration is especially effective when the apparatus 1 is connected to high power transformers, e.g. exceeding 1000 kVA, as a result of which protection of the insulating oil mixture against the emergence therein of moisture, air and polar charged particles due to ageing of the insulation is achieved. If the apparatus 1 is connected in such a configuration to an energized transformer 29, then replacement of individual tanks 2 with adsorbent 5 is carried out without a stop in their operation. In that case, a Buchholtz relay should be provided at the point of input of purified oil, and if gas appears passing through the electromagnetic valve, the relay will close down the transformer 29 and interrupt the power supply for the electric drive of the pump.

The apparatus 1 for small transformers 29 can be used for regenerating, dehydrating, degassing and filtering the whole insulation system.

Industrial Applicability

The possibilities for use of the method and apparatus according to the invention are quite diversified. Thus, they can be used for filtering, degassing and dehydrating, and for removing the products of oxidation from petroleum oils, which are disposed in vessels with a dehydrator of air. When the apparatus according to the invention is mounted on new transformers or on transformers which are at the initial phase of ageing, a substantial increase in their service life is ensured. At the same time it should be noted that in the case of high power transformers which are in operation, the method and apparatus according to the invention delay their ageing.

The method and apparatus according to the invention can be used with a high degree of efficiency for dehydrating transformers, ensuring the elimination of moisture from cellulose insulation, and also for dehydrating other oils and mixtures of petroleum products.

The apparatus according to the invention, had the same productivity, is of much less size and weight as compared with known apparatuses serving the same purpose. Wherein, the proposed apparatus is characterized by minimum power consumption, this being a result of the elimination of the steps of heating and vacuumizing the oils or their mixtures being processed.

I claim:

1. A method for filtering, degassing, dehydrating and removing products of ageing in petroleum oil or mixture of oils, based on passing the oil or a mixture of oils to be processed through an active component, wherein the oil or a mixture of oils is run through at least one mechanical filter to restrain particulate matter;

oil or mixture of oils filtered by the mechanical filter is passed through an active component, at least one adsorbent being used as the active component, wherein the oil or mixture of oils is passed through channels formed in a tank with the adsorbent by longitudinal and transverse partitions; and the oil or mixture of oils is processed in separate phases, which include degassing, dehydrating, and eliminating products of ageing, which are carried out by filling separate parts of a tank cavity with absorbents having different characteristics.

2. The method as in claim 1, wherein during mechanical filtering, particles having a size exceeding $4 \times 10^{-3}$ mm are restrained.

3. The method as in claim 1 or claim 2, wherein the phase of degassing and dehydrating is carried out, aluminosilicates of a crystalline structure with polar molecules of Na or Ca and Si in the crystalline lattice points are used as the adsorbent, the aluminosilicates ensuring the drawing in of by-products from the oil or mixture of oils being processed to the crystalline lattice points of the adsorbent.

4. The method as in claim 1 or claim 2, wherein the phase of removing products of ageing is carried out, gamma-type aluminum trioxide is used as the adsorbent, the molecules of the aluminum trioxide having a surface charge due to which bonding of polar molecules of products of ageing is ensured when they pass through pores of said adsorbent.

5. The method as in claims 1, which further comprises regenerating the adsorbents after they become saturated with moisture, gases or the products of ageing.

6. The method as in claim 5, wherein regeneration of saturated absorbents used to carry out the phase of degassing and dehydrating is carried out by heating them to a temperature of about 573 K or by acting on them with a high air pressure which is sharply increased by means of a compressor with dry air to a value of about 300 kPa, and subsequently withdrawing any gases that form.

7. The method as in claim 5, wherein regeneration of saturated adsorbents used to carry out the phase of removing the products of ageing is carried out by heating them in the presence of air to a temperature of about 813 K, wherein oxidation of bonded polar molecules of the products of ageing to molecules of water and carbon dioxide is ensured.

8. An apparatus for filtering, degassing, dehydrating and removing products of ageing in petroleum oil or a mixture of oils, comprising a vessel with an active component, which comprises:

at least one tank (2) having at least one aperture (22) for filling the tank with the active component (5) and inlet (7) and outlet (8) openings for feeding and discharging the oil or mixture of oils being processed;

input (9) and output (10) mechanical filters disposed in said inlet (7) and outlet (8) openings of the tank (2);

circulation pipe-lines (15) connected with said inlet (7) and outlet (8) openings; and at least two longitudinal partitions (3, 4) mounted between the side walls of the tank (2) with the active component (5) and forming channels for the passage of the oil or mixture of oils being processed;

wherein an adsorbent is used as the active component (5).

9. The apparatus as in claim 8, further comprising a transverse permeable partition (17) which separates the interior of the tank (2) with the active component (5) into an upper part and a lower part to be filled with a corresponding active component for carrying out the processing of oil or mixture of oils in separate phases, which include degassing, dehydrating, and eliminating products of ageing.

10. The apparatus as in claim 9, wherein the upper part of the tank (2) with the active adsorbent (5) is filled with an adsorbent ensuring the carrying out of the dehydrating phase, while the lower part is filled with an adsorbent ensuring the carrying out of the degassing phase, and wherein apertures (18) are made in the transverse partition along its periphery.

11. The apparatus as in any one of claims 8–10, wherein the input (9) and output (10) mechanical filters are made of bronze and ensure the restraining of particles having a size greater than $4 \times 10^{-3}$ mm.

12. The apparatus as in claim 8, wherein a measurer (20) of the saturation of the adsorbent and a manometer (21) are mounted in the apertures (22) for filling the tank (2) with an adsorbent (5).

13. The apparatus as in claim 8, wherein tanks (2), filled with at least one adsorbent (5) for carrying out separate phases of processing oil or a mixture of oils, are successively interconnected by circulation pipe-lines (15), wherein the inlet opening (7) of a first tank (2) with an adsorbent (5) is connected by a pipe-line (15) through a collector (23) to a delivery pump (13), while the outlet opening (8) of a last tank (2) with an adsorbent (5) is connected by means of a pipe-line (15) to a users tank (16) with the oil or mixture of oils being processed.

14. The apparatus as in claim 8 wherein tanks (2), filled with at least one adsorbent (5) for processing oil or a mixture of oils, are connected in parallel by means of circulation pipe-lines (15), wherein the inlet openings (7) of tanks (2) with an adsorbent (5) are connected by pipe-lines (15) through a first collector (23) to a delivery pump (13), while their outlet openings (8) are connected by pipelines (15) through a second collector (23) to a users tank (16) with the oil or mixture of oils being processed.

15. The apparatus as in claim 8, wherein aluminosilicates of a crystalline structure with molecules of Na or Ca and Si in the crystalline lattice points are selected as the material of the adsorbent (5) for carrying out the phase of degassing and dehydrating.

16. The apparatus as in claim 8, wherein aluminum oxides, preferably gamma-type aluminum trioxide, which is characterized by an average pore diameter of more than $9 \times 10^{-6}$ mm and an effective surface of not less than 150 $m^2/cm^3$, are selected as the material of the adsorbent (5) for bonding products of ageing or polar molecules.

* * * * *